United States Patent
Park et al.

(10) Patent No.: US 9,813,986 B2
(45) Date of Patent: *Nov. 7, 2017

(54) METHOD AND APPARATUS OF SLEEP MODE OPERATION IN A MULTI-CARRIER SYSTEM

(71) Applicant: LG ELECTRONICS INC., Seoul (KR)

(72) Inventors: Giwon Park, Anyang (KR); Kiseon Ryu, Anyang (KR); Youngsoo Yuk, Anyang (KR); Yongho Kim, Anyang (KR); Jinyoung Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,922

(22) Filed: May 16, 2016

(65) Prior Publication Data

US 2016/0262099 A1     Sep. 8, 2016

Related U.S. Application Data

(63) Continuation of application No. 14/533,850, filed on Nov. 5, 2014, now Pat. No. 9,369,957, which is a
(Continued)

(30) Foreign Application Priority Data

Nov. 20, 2009    (KR) .................. 10-2009-0112874

(51) Int. Cl.
*H04W 52/02*    (2009.01)
*H04W 76/04*    (2009.01)
(Continued)

(52) U.S. Cl.
CPC ... *H04W 52/0212* (2013.01); *H04W 52/0216* (2013.01); *H04W 76/048* (2013.01);
(Continued)

(58) Field of Classification Search
CPC . H04W 52/02; H04W 52/0203; H04W 84/12; H04W 80/04; H04W 88/06; H04W 74/08
(Continued)

(56) References Cited

U.S. PATENT DOCUMENTS 5,710,975 A    1/1998    Bernhardt et al.
6,201,966 B1    3/2001    Rinne et al.
(Continued)

FOREIGN PATENT DOCUMENTS

| CN | 101472272 A | 7/2009 |
|---|---|---|
| KR | 10-2005-0044170 A | 5/2005 |
| KR | 10-2008-0089762 A | 10/2008 |
| WO | WO 2008/094017 A2 | 8/2008 |

OTHER PUBLICATIONS

Hsu et al., "Sleep Mode Operations with Multi-carrier Support for IEEE 802.16m", IEEE 802.16 Presentation Submission Template (Rev. 9), IEEE C802.16m-08/1033r2, Sep. 16, 2008, pp. 1-6.
(Continued)

*Primary Examiner* — Warner Wong
(74) *Attorney, Agent, or Firm* — Birch, Stewart, Kolasch & Birch, LLP

(57) ABSTRACT

A method is presented for a mobile station operating in a wireless communication system. The mobile station receives configuration information for power management from a base station. The configuration information informs the mobile station a first time period during which the mobile station monitors signals from the base station and a second time period during which the mobile station does not monitor signals from the base station. The mobile station applies the configuration information for power management to one or more primary carriers and one or more activated secondary carriers. The mobile station receives downlink data from the base station via the one or more primary carriers and the one or more activated secondary carriers during the first time
(Continued)

period. The mobile station receives a specific Medium Access Control (MAC) message from the base station, wherein the mobile station stops the first time period when receiving the specific MAC message.

8 Claims, 10 Drawing Sheets

Related U.S. Application Data continuation of application No. 13/670,226, filed on Nov. 6, 2012, now Pat. No. 8,908,584, which is a continuation of application No. 12/860,287, filed on Aug. 20, 2010, now Pat. No. 8,325,640.

(60) Provisional application No. 61/235,692, filed on Aug. 21, 2009, provisional application No. 61/237,658, filed on Aug. 27, 2009, provisional application No. 61/241,032, filed on Sep. 10, 2009.

(51) Int. Cl.
*H04W 68/02* (2009.01)
*H04W 88/02* (2009.01)
*H04W 88/08* (2009.01)

(52) U.S. Cl.
CPC .......... *H04W 68/025* (2013.01); *H04W 88/02* (2013.01); *H04W 88/08* (2013.01); *Y02B 60/50* (2013.01)

(58) Field of Classification Search
USPC .................................................. 370/310–350
See application file for complete search history.

(56) References Cited

U.S. PATENT DOCUMENTS

| | | | |
|---|---|---|---|
| 6,243,579 B1 | 6/2001 | Kari | |
| 6,463,307 B1 | 10/2002 | Larsson et al. | |
| 8,515,481 B2 | 8/2013 | Chen et al. | |
| 8,588,119 B2 | 11/2013 | Panta et al. | |
| 8,638,704 B2 | 1/2014 | Gupta et al. | |
| 8,817,680 B2 | 8/2014 | Son et al. | |
| 2003/0119568 A1 | 6/2003 | Menard | |
| 2005/0075148 A1 | 4/2005 | Park | |
| 2009/0073907 A1 | 3/2009 | Cai | |
| 2010/0002612 A1 | 1/2010 | Hsu et al. | |
| 2010/0008277 A1* | 1/2010 | Kopikare | H04W 52/0274 370/311 |
| 2010/0008278 A1 | 1/2010 | Kone et al. | |
| 2010/0061284 A1 | 3/2010 | Chen et al. | |
| 2010/0232331 A1 | 9/2010 | Son et al. | |
| 2010/0267407 A1 | 10/2010 | Liao et al. | |
| 2010/0279683 A1 | 11/2010 | Lee | |
| 2011/0013548 A1 | 1/2011 | Chen et al. | |
| 2011/0053658 A1 | 3/2011 | Park et al. | |
| 2011/0069650 A1 | 3/2011 | Singh et al. | |
| 2011/0103281 A1 | 5/2011 | Son et al. | |
| 2011/0116430 A1 | 5/2011 | Kim et al. | |
| 2011/0176466 A1 | 7/2011 | Lindoff et al. | |
| 2011/0292851 A1 | 12/2011 | Fong et al. | |
| 2013/0272183 A1 | 10/2013 | Chen et al. | |

OTHER PUBLICATIONS

Kim et al., "Functional Details of Sleep Mode for Multi-carrier Operation in IEEE 802.16m", IEEE 802.16 Broadband Wireless Access Working Group http://ieee802.org/16, IEEE C802.16m-09/1027, Apr. 27, 2009, pp. 1-7.

* cited by examiner

METHOD AND APPARATUS OF SLEEP MODE OPERATION IN A MULTI-CARRIER SYSTEM

CROSS-REFERENCE TO RELATED APPLICATIONS

This application is a Continuation of U.S. patent application Ser. No. 14/533,850 filed on Nov. 5, 2014, (now U.S. Pat. No. 9,369,957 issued on Jun. 14, 2016) which is a Continuation of U.S. patent application Ser. No. 13/670,226 filed on Nov. 6, 2012 (now U.S. Pat. No. 8,908,584 issued on Dec. 9, 2014), which is a Continuation of U.S. patent application Ser. No. 12/860,287 filed on Aug. 20, 2010 (now U.S. Pat. No. 8,325,640 issued on Dec. 4, 2012), which claims the benefit under 35 U.S.C. §119(e) to U.S. Provisional Application Nos. 61/241,032 filed on Sep. 10, 2009, 61/237,658 filed on Aug. 27, 2009 and 61/235,692 filed on Aug. 21, 2009, and under 35 U.S.C. §119(a) to Korean Patent Application No. 10-2009-0112874 filed on Nov. 20, 2009, all of which are hereby expressly incorporated by reference into the present application.

BACKGROUND OF THE INVENTION

The present disclosure relates to a method and apparatus of establishing a sleep mode operation, and more particularly, to a method and apparatus of establishing a sleep mode operation in a multi-carrier system.

With the development of the communication technology, services provided by a mobile communication system are being gradually developed into packet data transmission and/or reception services, multimedia broadcasting services, and the like, as well as voice communication services.

In the third generation services, such as WCDMA currently being serviced, high capacity data as well as voice can be transmitted and received at a high transmission rate, and furthermore, the standardization work is actively carried out, such as long-term evolution network (LTE), IEEE 802.16m, and the like, in order to make an evolved network having a wider bandwidth, considering a rapid increase of data traffic in the future.

In particular, IEEE 802.16m, for which its standardization work is carried out, has set a goal to develop a standard specification satisfying the requirement of an IMT-Advanced system while maintaining compatibility with existing 802.16-based terminals and base station equipment. In the IMT-Advanced system, above all, more than 40 MHz of broadband communication service support is required, and in IEEE 802.16m, broadband communication support is also essential to satisfy the requirement of the IMT-Advanced system. However, it is in fact difficult to define a standard for all bandwidths, and as a result, a communication system using a multi-carrier approach that supports broadband using a plurality of carriers is under discussion. In the multi-carrier system, discussed under IEEE 802.16m, it is possible to transmit and/or receive data between a terminal and a base station by accessing to each other through at least two and more frequency assignments (FAs) at the same time, and therefore, it has an advantage that high-capacity, high-speed data transmission and reception is possible compared to the existing single-carrier approaches. Also, it has a feature that communication is possible using a broader bandwidth from the standpoint of a mobile station (MS) depending on circumstances, and more users can be accommodated from the standpoint of a base station (BS).

On the other hand, since the mobility of terminals is considered in a wireless mobile communication system, the problem of power consumption in terminals may be a considerably important element compared to other systems. The sleep mode operation between a terminal and a base station has been proposed as one of such methods for minimizing power consumption in the terminal.

In the sleep mode operation in a single-carrier system, a terminal requests to enter into a sleep mode if there exists no more traffic to be transmitted and/or received to and/or from a base station while performing communication with the base station in an active mode, and receives a response to that request from the base station to change the state thereof to a sleep mode.

The terminal that has entered into a sleep state receives a message indicating whether there exists a traffic transferred from the base station during a sleep listening window, and determines that there exists no data traffic transmitted to a downlink, and increases the current sleep cycle if negative indication indicating that there exists no traffic is received.

Furthermore, if positive indication is received from the base station during the listening window, then the terminal determines that there exists data traffic transferred to a downlink, and initializes the current sleep cycle.

However, since multiple carriers are used in a multi-carrier system, the existing single-carrier system sleep mode operation cannot be applied thereto as it is, and thus there is a need for presenting sleep mode parameters for supporting more effective sleep mode operations in a multi-carrier environment, and a detailed sleep mode operation method in a multi-carrier system using the same.

SUMMARY OF THE INVENTION

One aspect of the present disclosure is to provide a method and apparatus of establishing a sleep mode operation in a multi-carrier system.

Also, another aspect of the present invention is to provide a sleep mode operation in a multi-carrier system in which the listening window of a secondary carrier is indicated to be early terminated based on the generated traffic, thereby preventing unnecessary power consumption in a terminal.

In order to accomplish the foregoing object, according to an embodiment of the present invention, a method of establishing a sleep mode operation through active primary and secondary carriers in a communication system of transmitting and receiving data using a multi-carrier including a primary carrier for transmitting and receiving control information and data and a secondary carrier using a radio frequency (RF) different from the primary carrier, may include transmitting, through the primary carrier, to a terminal, a sleep cycle ID (SCID), a listening window, and traffic indication inactive information, the traffic indication inactive information indicating that an indication (TRF-IND) as to whether traffic is generated is not transferred to the terminal; transmitting downlink data to the terminal through the primary carrier and the active secondary carrier during the listening window; and sending, through the primary carrier, to the terminal, an instruction(indication) to end (terminate) the downlink data transmission over the active secondary carrier when the data transmitting is completed.

Preferably, the instruction to end the downlink data transmission includes a listening window early termination indication indicating to early terminate the listening window of the active secondary carrier that has received the downlink data when the data sending is completed.

Preferably, the method further may include allocating the downlink data on the primary carrier and the active secondary carrier.

Preferably, the listening window early termination indication of the active secondary carrier that has received the downlink data is transferred through a sleep control header (SCH) a sleep control extended header (SCEH).

In order to accomplish the foregoing object, according to another embodiment of the present invention, a method of establishing a sleep mode operation through active primary and secondary carriers in a communication system of transmitting and receiving data using a multi-carrier including a primary carrier for transmitting and receiving control information and data and a secondary carrier using a radio frequency (RF) different from the primary carrier, may include transmitting, through the primary carrier, to a terminal, a sleep cycle ID (SCID), a listening window, and traffic indication inactive information, the traffic indication inactive information indicating that an indication (TRF-IND) as to whether traffic is generated is not transferred to the terminal; transmitting downlink data to the terminal through the primary carrier or active secondary carrier during the listening window; and sending, through the primary carrier, to the terminal, an instruction to end the downlink data transmission over the primary carrier or the active secondary carrier when the data transmitting is completed.

In order to accomplish the foregoing object, according to still another embodiment of the present invention, a method of establishing a sleep mode operation through active primary and secondary carriers in a communication system of transmitting and receiving data using a multi-carrier including a primary carrier for transmitting and receiving control information and data and a secondary carrier using a radio frequency (RF) different from the primary carrier, may include requesting a sleep mode switching to a base station through the primary carrier; receiving, through the primary carrier, from the base station, a sleep cycle ID (SCID), a listening window, and traffic indication inactive information, the traffic indication inactive information indicating that an indication (TRF-IND) as to whether traffic is generated is not transferred from the base station; entering into a multi-carrier sleep mode having a listening window capable of receiving data and a sleep window, the multi-carrier sleep mode incapable of receiving data; receiving data through the primary carrier and the active secondary carrier from the base station during the listening window; receiving, through the primary carrier, an instruction ending the downlink transmission over the active secondary carrier when the data reception is completed; and switching to a sleep window upon early-terminating the listening window of the active secondary carrier.

Preferably, the instruction ending the downlink data transmission includes a listening window early termination indication indicating to early terminate the listening window of the active secondary carrier that has received the downlink data when the data sending is completed.

In order to accomplish the foregoing object, according to yet still another embodiment of the present invention, a method of establishing a sleep mode operation through active primary and secondary carriers in a communication system of transmitting and receiving data using a multi-carrier including a primary carrier for transmitting and receiving control information and data and a secondary carrier using a radio frequency (RF) different from the primary carrier, may include requesting a sleep mode switching to a base station through the primary carrier; receiving, through the primary carrier, from the base station, a sleep cycle ID (SCID), a listening window, and traffic indication inactive information, the traffic indication inactive information indicating that an indication (TRF-IND) as to whether traffic is generated is not transferred from the base station; entering into a multi-carrier sleep mode having a listening window capable of receiving data and a sleep window, the multi-carrier sleep mode incapable of receiving data; receiving data through the primary carrier or the active secondary carrier from the base station during the listening window; receiving, through the primary carrier, an instruction ending the downlink transmission over the active secondary carrier when the data reception is completed; and switching to a sleep window upon early-terminating the listening window of the primary carrier or the active secondary carrier.

In order to accomplish the foregoing object, according to an embodiment of the present invention, an apparatus of establishing a sleep mode operation through active primary and secondary carriers in a communication system of transmitting and receiving data using a multi-carrier including a primary carrier for transmitting and receiving control information and data and a secondary carrier using a radio frequency (RF) different from the primary carrier, may include a receiver configured to receive a state change request into the sleep mode from a terminal; a transmitter configured to transmit, through the primary carrier, a sleep cycle ID (SCID), a listening window, and traffic indication inactive information indicating that an indication (TRF-IND) as to whether traffic is generated is not transferred to the terminal, and to send downlink data to the terminal through the active primary and secondary carrier during the listening window; and a controller configured to generate an instruction ending the downlink transmission over the active secondary carrier when the data reception is completed, wherein the instruction includes a listening window early termination indication indicating to early terminate the listening window of the active secondary carrier of the terminal receiving the downlink data when the data reception is completed, wherein the instruction generated by the controller is sent to the terminal through the primary carrier.

In order to accomplish the foregoing object, according to another embodiment of the present invention, an apparatus of establishing a sleep mode operation through active primary and secondary carriers in a communication system of transmitting and receiving data using a multi-carrier including a primary carrier for transmitting and receiving control information and data and a secondary carrier using a radio frequency (RF) different from the primary carrier, may include a transmitter configured to transmit a state change request into the sleep mode through the primary carrier to a base station; a receiver configured to receive, through the primary carrier, from the base station, a sleep mode parameter including a sleep cycle ID (SCID), a listening window, and an indication (TRF-IND) as to whether traffic is generated; and a controller configured to control a sleep mode operation with reference to the sleep mode parameter received through the receiver, wherein the controller controls to receive an instruction ending the downlink transmission over the active secondary carrier, wherein the instruction includes a listening window early termination indication indicating to early terminate the listening window of the active secondary carrier of the terminal that has completed the downlink data through the receiver, and early terminate the listening window of the active secondary carrier when the downlink data reception through the primary carrier and the activated secondary carrier from the base station is completed.

According to the present invention, there is produced the effect of providing a method of establishing a sleep mode operation in a terminal using a multi-carrier.

In addition, according to the present invention, the terminal continues to maintain a secondary carrier that has been activated during the normal mode in an active state also in the sleep mode state, thereby preventing the generation of a MAC management message (CM-CMD, CM-IND) for activating or deactivating secondary carriers. For the secondary carrier maintaining an active state in the sleep mode, the listening window is early terminated based on the generated traffic characteristic, thereby producing the effect of preventing signaling overhead and reducing the power consumption of the terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
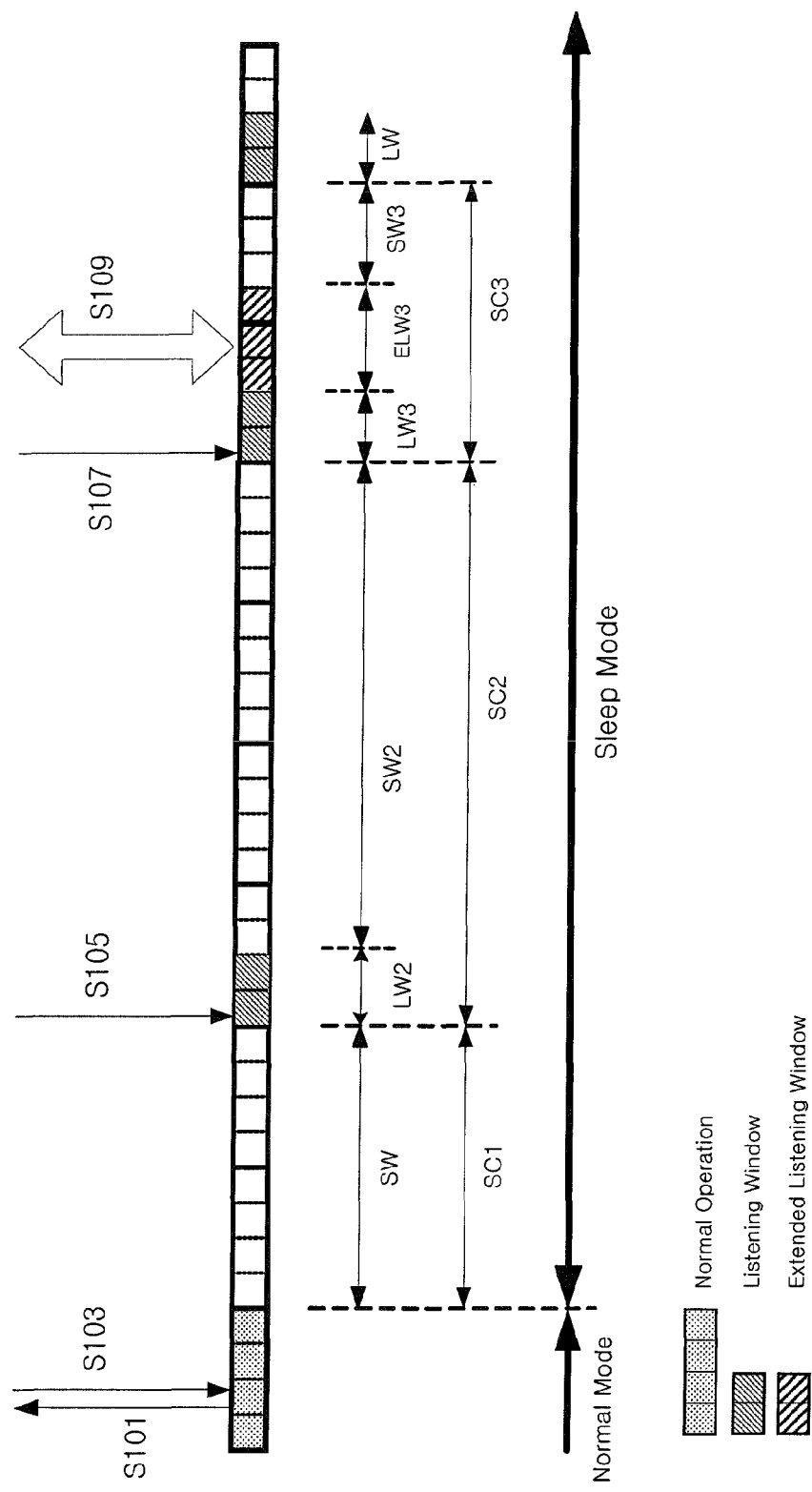
FIG. 1 is a view schematically illustrating a sleep mode operation.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, the term "terminal" is used, but the terminal may be also referred to as a subscriber station (SS), user equipment (UE), mobile equipment (ME), and a mobile station (MS). Furthermore, the terminal may be portable equipment having a communication function such as portable phone, PDA, smart phone, notebook, etc., or non-portable equipment such as PC, vehicle mounted device, etc.

FIG. 1 is a view schematically illustrating a sleep mode operation in a single-carrier system.

A terminal transmits a SLP-REQ message for requesting to switch to a sleep mode to the base station if there exists no more traffic to be transmitted or received in a normal state (S101), and receives a SLP-RSP message including a sleep parameter such as sleep cycle, listening window, and the like from the base station (S103) and the state thereof is switched to a sleep mode.

The SLP-RSP message may include a traffic indication message flag (TIMF) parameter representing whether a TRF-IND message indicating whether data traffic is generated during the sleep mode operation of a terminal is transferred from the base station to the terminal during the listening window.

The TRF-IND message indicating whether data traffic is generated is not transferred from the base station to the terminal during the listening window if the TIMF parameter is set to "0", and the TRF-IND message indicating whether data traffic is generated is transferred from the base station to the terminal during the listening window if the TIMF parameter is set to "1".

The sleep mode may include a sleep window (SW) incapable of receiving data and a listening window (LW) capable of receiving data.

The terminal increases power to be changed to a state capable of transmitting or receiving data traffic in the listening window (LW), and the terminal decreases power to enter into a power saving mode in the sleep window (SW).

The terminal applies operate a sleep mode by applying a sleep cycle (SC1) including only a sleep window (SW1) when changing the state to an initial sleep mode. From a second sleep cycle subsequent to terminating the first sleep cycle (SC1), the terminal operates the sleep mode by applying a sleep cycle (SC2) including a listening window (LW2) and a sleep window (SW2).

In the second sleep cycle (SC2), if a TRF-IND message including negative indication is received from the base station during the listening window (LW2) (S105), then the terminal determines that there exists no traffic transmitted to a downlink, thereby increasing the current sleep cycle twice.

Subsequent to terminating the sleep cycle (SC2) increased twice, if a TRF-IND message including positive indication is received during a listening window (LW3) of the following sleep cycle (SC3) (S107), then the terminal extends the listening window (ELW3) to receive the generated data traffic and then receives data traffic from the base station (S109), and enters into a sleep window (SW3) again to perform a sleep mode operation. At this time, the sleep cycle (SC3) includes a listening window (SW3), an extended listening window (LW3), and a sleep window (SW3) as illustrated in the drawing, and then the sleep cycle (SC3) is reset to an initial sleep cycle (SC1).

Figure 2:
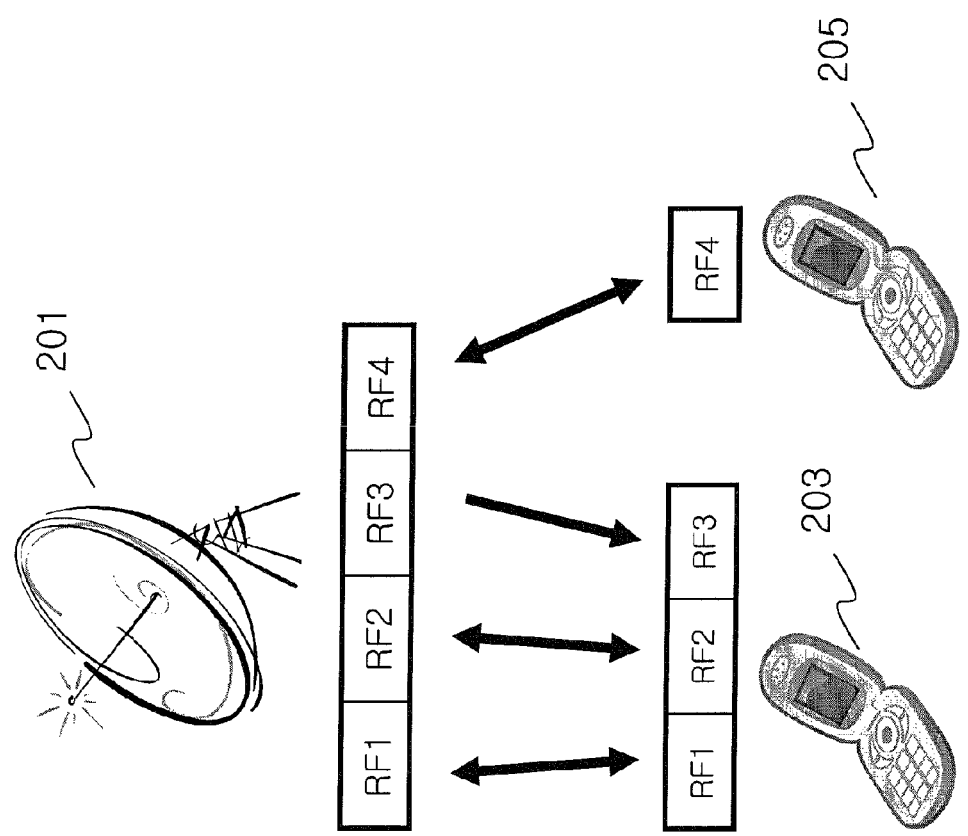
FIG. 2 is a view schematically illustrating a multi-carrier system according to an embodiment of the present invention.

FIG. 2 is a view schematically illustrating a multi-carrier system according to an embodiment of the present invention;

As illustrated in FIG. 2, in a multi-carrier mode according to the present invention, the number of carriers allocated to terminals 203, 205 by a base station 201 to be used for data transmission and/or reception, or the like, may be at least two or more. According to an embodiment, for the sake of convenience of explanation, it will be described below a case where four carriers RF1, RF2, RF3 and RF4 are used. The base station 201 may allocate multiple carriers RF1, RF2, and RF3 for a terminal 203 to be used in a multi-carrier mode, and a carrier RF4 may be also allocated to another terminal 205 from the base station 201. In this case, the terminal 203 operates in a multi-mode by using one or more carriers, and the terminal 205 operate in a single-mode by using only one carrier.

In the base station 201, the multi-carrier type can be divided into two kinds of groups, a fully configured carrier (hereinafter, "FCC"), and a partially configured carrier (hereinafter, "PCC"). The fully configured carrier is defined as a carrier capable of transmitting and/or receiving uplink/downlink data and control information, and the partially configured carrier as a carrier capable of transmitting only downlink data to a terminal.

Referring to FIG. 2, RF1 and RF2, among the carriers allocated to the terminal 203, correspond to the fully configured carrier capable of transmitting and/or receiving uplink/downlink data and terminal control information. RF3, allocated to the terminal 203, corresponds to the partially configured carrier capable of transmitting downlink data only from a base station to a terminal. The carrier RF4, allocated to the terminal 205, corresponds to the fully configured carrier capable of transmitting and/or receiving uplink/downlink data and terminal control information, and in case of a single-mode type such as the terminal 205, the carrier RF4 is preferably allocated in a fully configured carrier type since only one carrier RF4 is allocated.

From the standpoint of the terminals 203, 205, the types of carrier allocated from a base station can be divided into two kinds of groups, a primary carrier and a secondary carrier. Preferably, one primary carrier and a plurality of secondary carriers can be allocated to a terminal from a base station. According to the present invention, the primary carrier can transmit and/or receive data traffic and PHY/MAC control information between a terminal and a base station, and functions as a carrier mainly used for a control function such as network entry of a terminal. Furthermore, the secondary carrier can be allocated to a terminal based upon a resource allocation command of the base station, and is mainly used as a carrier for mainly transmitting and/or receiving data traffic.

Among the carriers allocated to the terminal 203, RF1 or RF2 may become a primary carrier, and RF3 becomes a secondary carrier. Similarly, RF4, allocated to the terminal 105, functions as a primary carrier. As illustrated in FIG. 2, in a multi-carrier system, it is possible to support the terminal 203 supporting a multi-carrier approach and the terminal 205 supporting a single-carrier approach only at the same time, and the terminal 203 supporting a multi-carrier approach can be also used as a single-mode using a single-carrier approach based upon data traffic. However, even if it is used as a multi-mode or single-mode, at least one carrier should be allocated. Here, the relevant carrier functions as a primary carrier when only one carrier is allocated.

The primary carrier of a terminal is a fully configured carrier defined by a base station, and a carrier that has performed an initial network entry procedure will be determined as a primary carrier. The secondary carrier can be set to a fully configured carrier or partially configured carrier, and it can be allocated additionally based upon a request or instruction of the terminal or base station. Preferably, the terminal can transmit and/or receive all control information and secondary carrier information through a primary carrier, and mainly receive information associated with downlink data transmission and reception through a secondary carrier.

In case where the state of the terminal is transitioned to a sleep mode in the foregoing multi-carrier environment, it may be not preferable from the standpoint of power saving if active (or activated) secondary carriers in the normal mode continue to be also used in an active state after being transitioned to a sleep mode.

In case where the terminal is operated such that secondary carriers are all deactivated when the state thereof is transitioned to a sleep mode for the power saving of the terminal, and then the secondary carriers are activated or deactivated based on whether traffic is generated while being operated in a sleep mode, it may cause a problem of increasing signaling overhead to a MAC management message (for example, carrier management-command (CM-CMD), carrier management-indication (CM-IND)) that should be transmitted or received between the base station and the terminal to activate or deactivate the secondary carriers.

Also, in case where a service provided to the terminal in a sleep mode state is a real-time service, data traffic has periodicity and thus indication (TRF-IND) as to whether additional traffic is generated may not be transferred from the base station to the terminal. In this case, if traffic transmission is completed through a primary carrier and a plurality of secondary carriers in a sleep mode, then it may be impossible to indicate to deactivate secondary carriers or early terminate the listening window to prevent the power consumption of the terminal.

According to the present invention, active (activated) secondary carriers continue to be maintained in an activated state in a normal mode even after the state of the terminal is transitioned from the normal mode to a sleep mode, thereby preventing signaling overhead generation to a MAC management message (CM-CMD, CM-ND) that should be transmitted or received between the base station and the terminal to activate or deactivate the secondary carriers.

On the other hand, in case where it is determined that no or a little traffic is generated for the secondary carriers maintained in an activated state, there is proposed a method of early terminating the listening window of the secondary carriers.

In addition, in case where the traffic indication message flag (TIMF) is set to "0" in the SLP-RSP when entering into a sleep mode in a multi-carrier environment and thus a TRF-IND message is not transferred from the base station to the terminal during the listening window, there is proposed a method of indicating to early terminate a secondary carrier listening window through a multi-carrier sleep control extended header (SCEH) when traffic transmission from the base station to the terminal is all completed or there is a little traffic to be transmitted.

Figure 3:
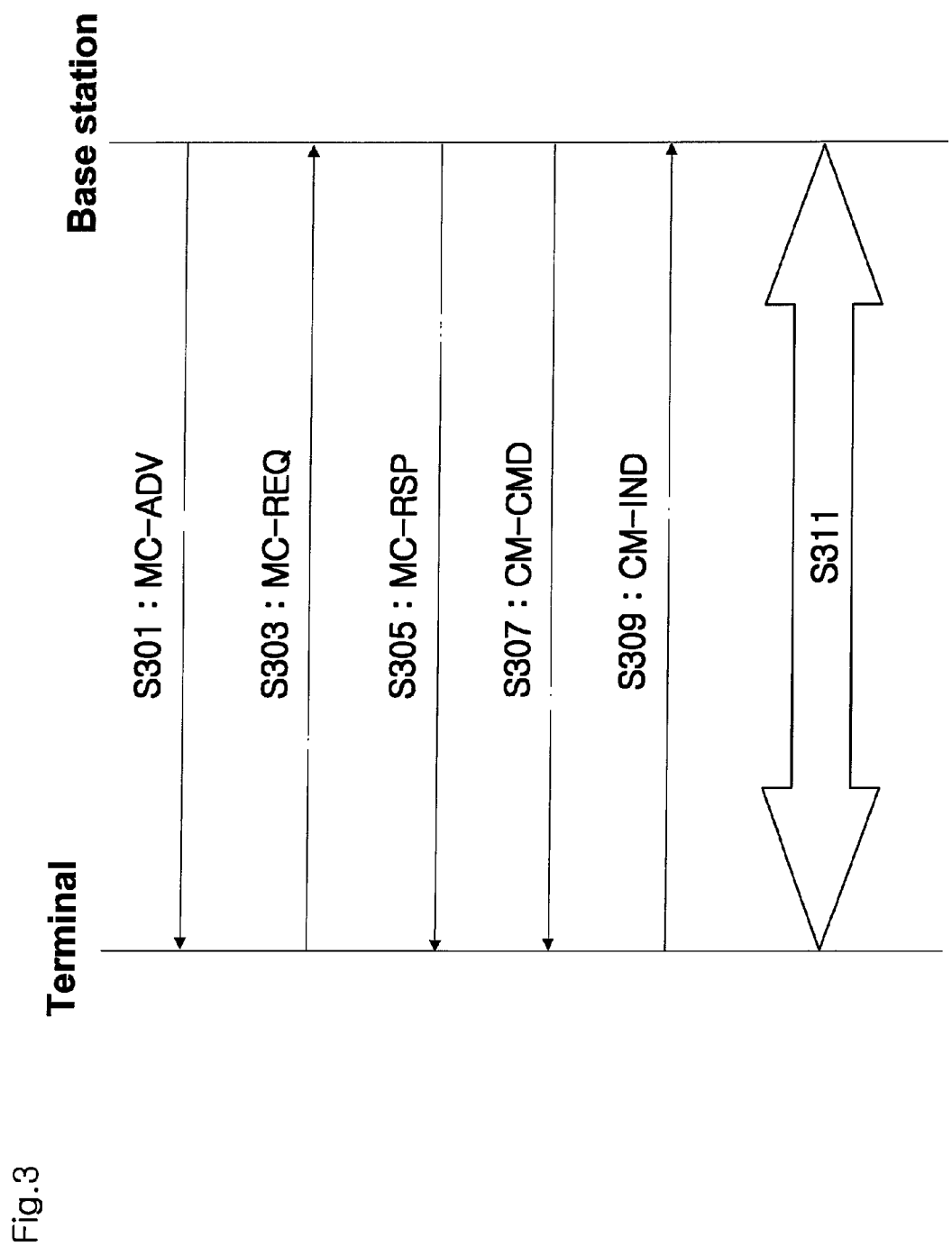
FIG. 3 is a block diagram sequentially illustrating a data communication method through a multi-carrier between a terminal and a base station.

FIG. 3 is a block diagram sequentially illustrating a data communication method through a multi-carrier between a terminal and a base station.

The base station periodically broadcasts a multi-carrier advertising (MC-ADV) message to the terminal (S301). The MC-ADV message may include a physical carrier index, a center frequency (e.g., band class index and channel index), a channel bandwidth, a carrier type (fully configured or partially configured), a duplexing mode, a preamble index, a transmit power, and the like.

The terminal supporting a multi-mode transmits a MC-REQ message for requesting carrier allocation based on physical carrier indices of the MC-ADV message transmitted by the base station (S303). The MC-REQ message transmitted by the terminal may include parameters, such as whether multi-carrier is supported by the terminal for carrier allocation, a candidate allocation carrier list, and the like.

The base station transmits a MC-RSP message including an assigned carrier list in response to the MC-REQ message transmitted by the terminal (S305). At this time, the remaining secondary carriers excluding a primary carrier (carrier index #0) in an assigned carrier list included in the MC-RSP message can be used only when they are activated through a CM-CMD message.

Subsequently, the base station determines the necessity of activating the allocated secondary carriers when necessary, for example, by considering load balance or the like of the carriers to satisfy QoS, and transmits the CM-CMD message (S307).

Through the CM-CMD, a carrier to be activated as a secondary carrier may be indicated among the assigned carriers allocated to the terminal, and also, the carriers to be deactivated may be indicated among the active secondary carriers being currently used, thereby managing the carriers of the terminal.

The terminal transmits a CM-IND message to the base station in response to the CM-CMD transmitted by the base station to confirm the operation with respect to the carrier activation or deactivation requested through the CM-CMD (S309). In case of newly activating secondary carrier(s), the terminal transmits the CM-CMD after being prepared to transmit data through the active secondary carrier.

Subsequently, the terminal performs communication for transmitting and/or receiving data to and/or from the base station through the active primary carrier and secondary carriers (S311). The primary carrier and active secondary carriers are called active carrier(s) as a whole.

Figure 4:
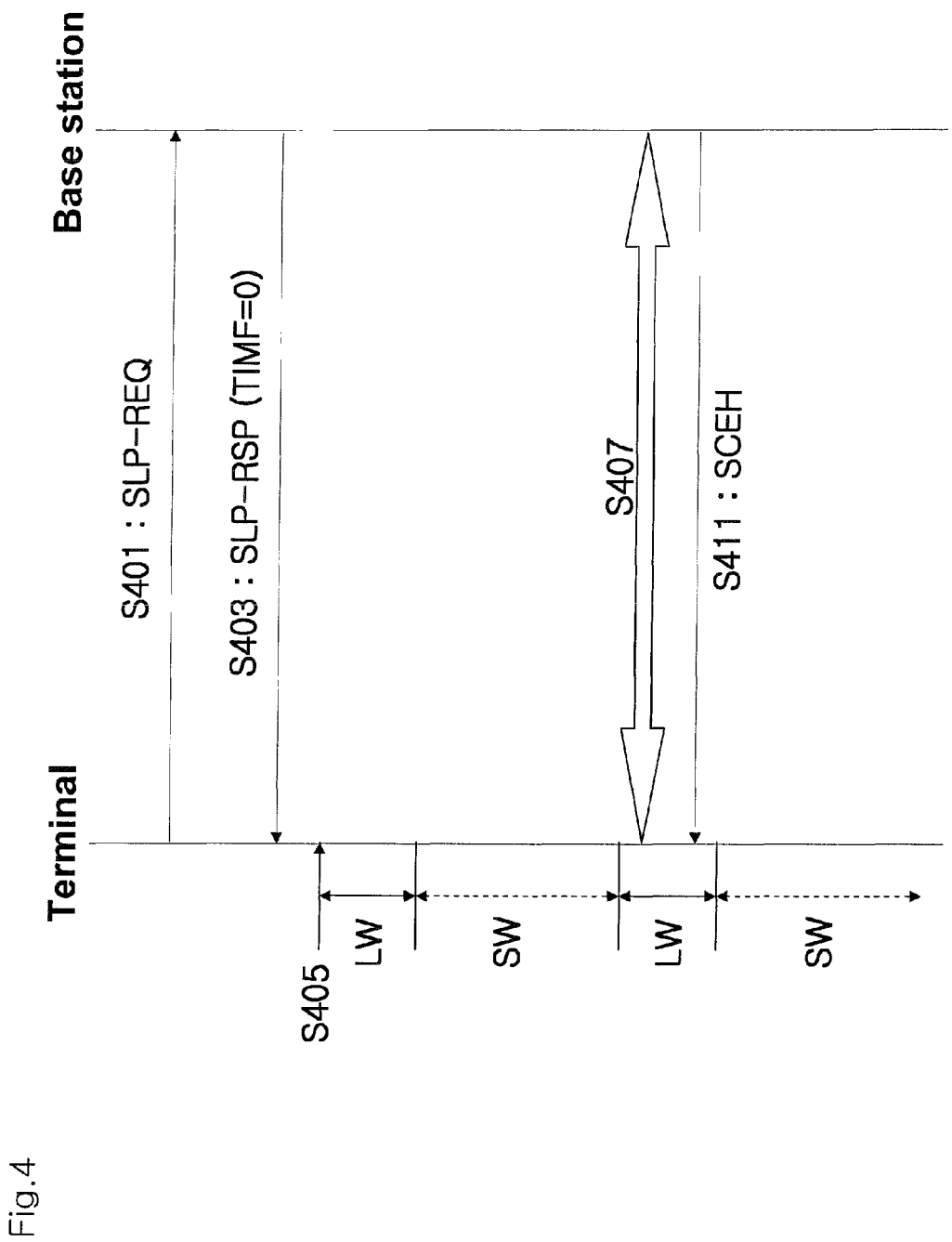
FIG. 4 is a block diagram illustrating a sleep mode operation of a terminal in a multi-carrier environment according to an embodiment of the present invention.

FIG. 4 is a block diagram illustrating a sleep mode operation of a terminal in a multi-carrier environment according to an embodiment of the present invention.

If there is no communication with the base station for a predetermined period of time subsequent to data communication with the base station, then the terminal transmits an SLP-REQ message to the base station to request the state change into a sleep mode (S401).

The base station transmits an SLP-RSP message in response to the SLP-REQ transmitted by the terminal (S403).

At this time, if only real-time services exist or real-time and non-real-time services are mixed together for the traffic type being serviced to the terminal by the base station, then the base station transmits traffic indication inactive information indicating that an indication (TRF-IND) as to whether traffic is generated is not transmitted to the terminal, to the terminal. According to circumstances, the traffic indication active information may be transmitted to the terminal.

The traffic indication inactive information in which a traffic indication message flag (TIMF) parameter is set to "0" will be included in the SLP-RSP message to be transmitted. In case of an active state, the TIMF parameter is set to "1".

The terminal refers to a start frame number parameter which is a sleep mode start frame timing included in the SLP-RSP message to transition the state into a sleep mode (S405).

Subsequently, the terminal may receive a downlink message transmitted by the base station during the listening window of the sleep mode through a primary carrier and/or secondary carriers activated in the normal mode state, and may transmit an uplink message to the base station through the active carriers (S407).

If traffic transmission being serviced through all secondary carriers is completed or traffic transmission being serviced through one or more secondary carriers is completed, then the base station transmits a sleep control extended header through the primary carrier, thereby indicating to early terminate the listening window of the secondary carrier and reduce the power consumption of the terminal (S411).

According to the present invention, even though traffic transmission through a secondary carrier has been completed, the secondary carrier is not deactivated but only the listening window is early terminated, thereby reducing signaling overhead to the transmission of a carrier management message (CM-CMD, CM-IND) for deactivating the secondary carrier.

Figure 5:
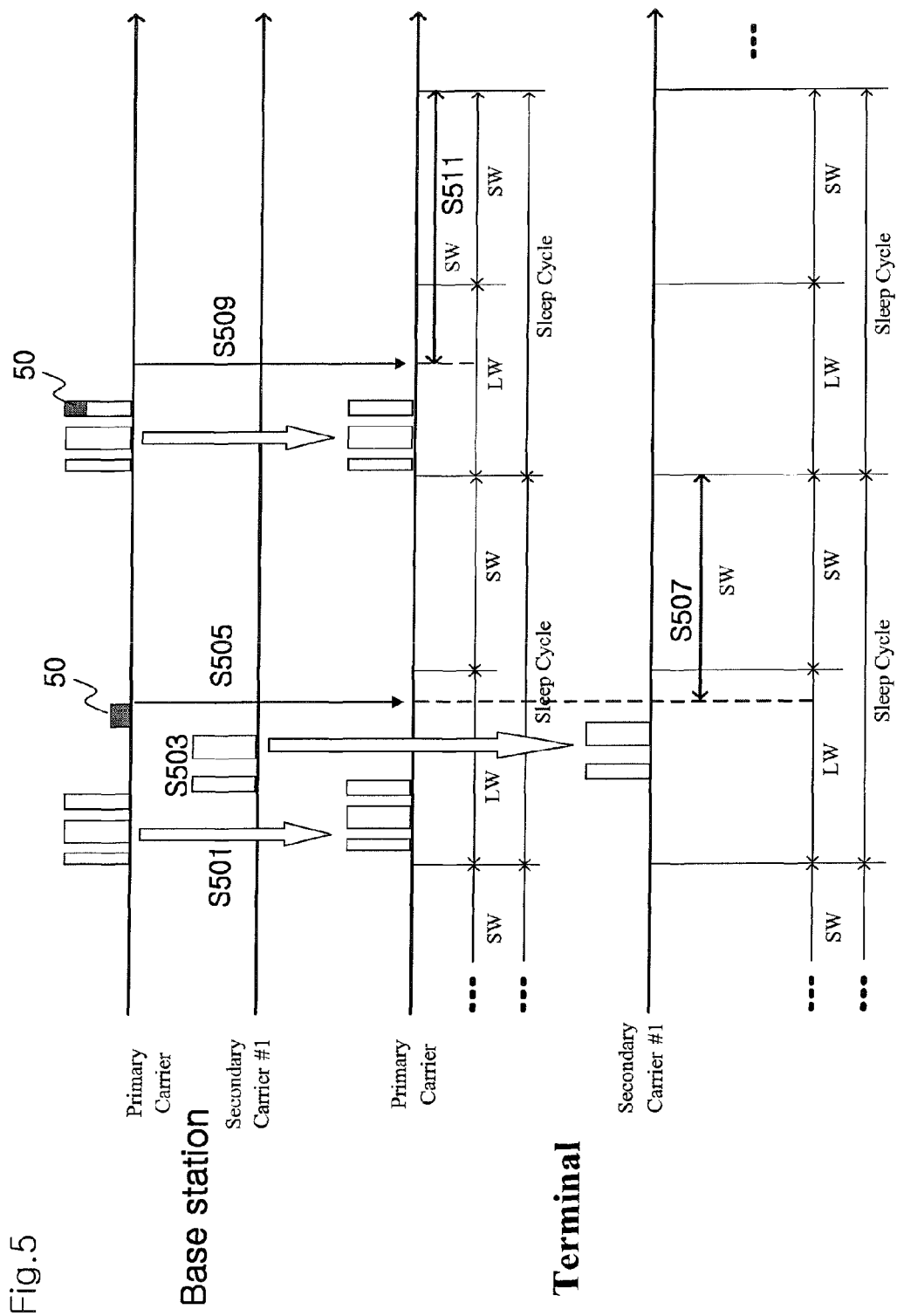
FIG. 5 is a view illustrating a multi-carrier sleep mode control operation through SCEH according to an embodiment of the present invention.

FIG. 5 is a view illustrating a multi-carrier sleep mode control operation through SCEH according to an embodiment of the present invention.

As illustrated in FIG. 5, the base station and the terminal perform traffic exchange through a primary carrier and a secondary carrier #1 (S501, S503).

At this time, in a circumstance that the terminal receives real-time services and non-real-time services together, the base station is configured not to transmit the TRF-IND message to the terminal. However, if the terminal receives other services, it may be configured to transmit the TRF-IND message to the terminal.

Furthermore, a sleep mode parameter (sleep cycle, listening window interval, etc.) negotiated with the base station when the terminal enters into a sleep mode may be similarly applied to the primary and secondary carrier.

If traffic transmission through the secondary carrier #1 is completed while the terminal receives a service from the base station through the primary carrier and the secondary carrier #1 in the listening window, then the base station transmits a SCEH message to the terminal through the primary carrier (S505). The SCEH message may include information indicating to early terminate the listening window of the secondary carrier #1.

The terminal that has received the SCEH message early terminates the listening window (LW) and enters into a sleep window to reduce power consumption (S507).

Subsequently, if traffic exchange is completed while receiving a service through the primary carrier, then the base station transmits a SCEH message to the terminal through the primary carrier, thereby indicating to early terminate the listening window of the primary carrier (S509).

The terminal that has received SCEH early terminates the listening window (LW) and enters into a sleep window to reduce power consumption (S511).

Otherwise, if traffic transmission through the primary carrier and the secondary carrier #1, which are all active carrier(s), is completed while receiving a service from the base station through the primary carrier and the secondary carrier #1, then the base station transmits a SCEH message to the terminal through the primary carrier. The SCEH message may include information indicating to early terminate the listening window of the primary carrier and the secondary carrier #1.

In other words, if data transmission through an active carrier is completed, then the base station transmits SCEH through the primary carrier thereby enabling the terminal to early terminate the listening window of the active carrier in which the transmission is completed. Here, the active carrier includes both the primary or secondary carrier.

Figure 6:
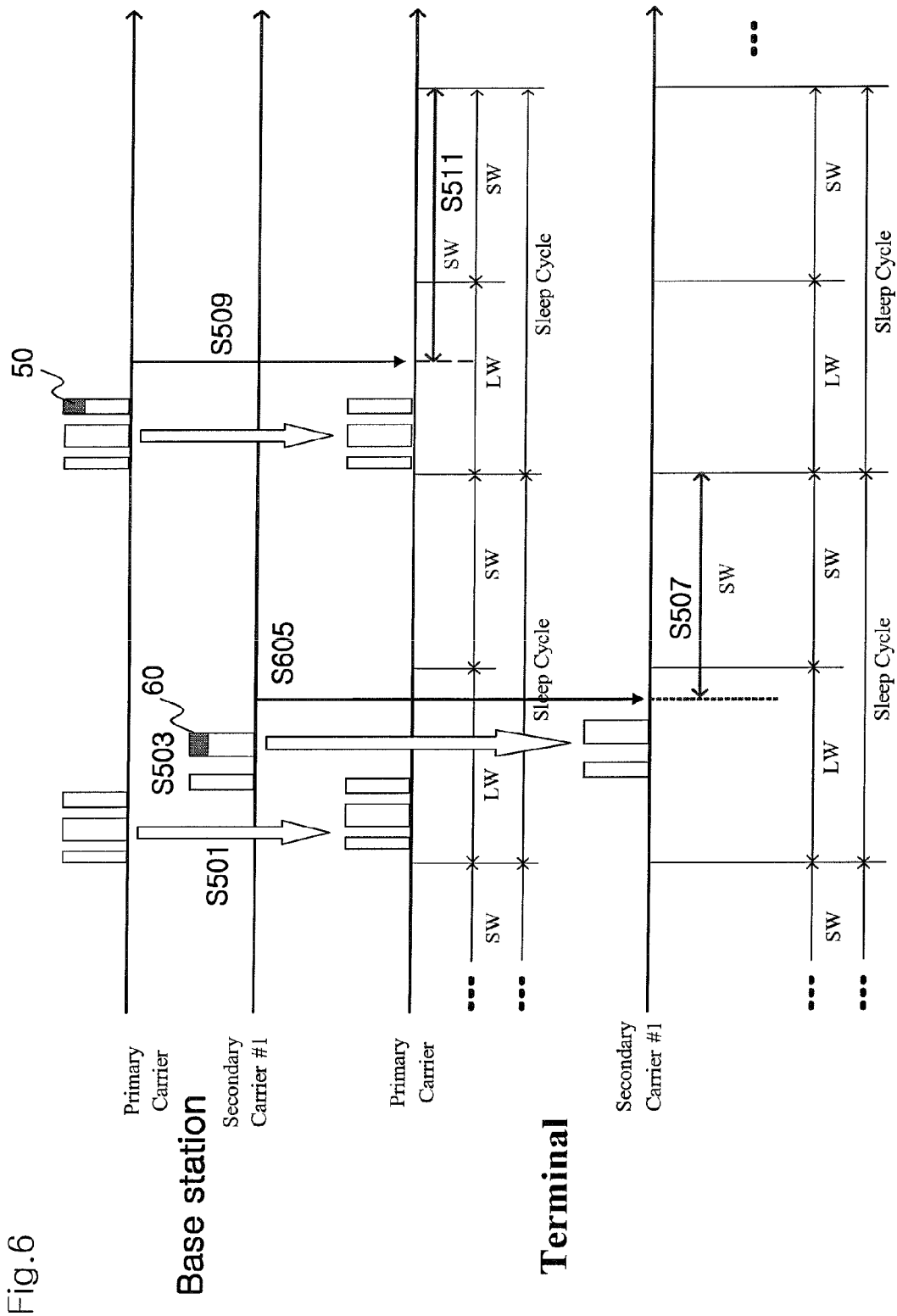
FIG. 6 is a view illustrating a multi-carrier sleep mode control operation through SCEH according to another embodiment of the present invention.

FIG. 6 is a view illustrating a multi-carrier sleep mode control operation through SCEH according to another embodiment of the present invention.

In this embodiment, SCEH is transmitted through a secondary carrier differently from the embodiment illustrated in FIG. 5.

With the exception that SCEH is transmitted through a secondary carrier, the foregoing embodiment illustrated in FIGS. 4 and 5 will be similarly applied in the aspect of operation, and therefore, the detailed description will be omitted.

The format of a SCEH message, proposed by the present invention, may be defined and used as SCEH in a multi-carrier environment capable of indicating to control the listening window of multiple carriers. According to circumstances, a multi-carrier listening window control bit may be additionally used in a sub-type parameter capable of indicating to control a multi-carrier listening window in the SCEH in a single-carrier environment.

The format of the SCEH message in a multi-carrier environment is illustrated in the following Table 1.

TABLE 1

| Syntax | Size (bit) | Notes |
|---|---|---|
| Multi-Carrier Sleep Control EH format( ) { | | |
| LAST | 1 | 0 = Another extended header follows MCSCEH<br>1 = Another extended header does not follow MCSCEH |
| Type | — | MCSCEH Type |
|     Target carrier index | — | Target carrier index for listening window termination |
| } // End of Multi-Carrier Sleep Control EH format( ) | | |

The multi-carrier SCEH may include a target carrier index, which is a parameter for target carriers in which the listening window is early terminated. The listening window of the primary or secondary carrier corresponding to the target carrier index will be early terminated.

If a multi-carrier SCEH with the format as illustrated in Table 1 is used, then multiple multi-carrier sleep control extended headers should be transmitted to the terminal to early terminate the listening window of multiple carriers. This is because a size of the extended header is fixed and the number of carriers in which the LW is to be terminated according to the traffic circumstances is variable, and thus it is difficult to include them in one message.

Accordingly, it may be possible to indicate to terminate the listening window of all carriers by not including the target carrier index in the multi-carrier sleep control extended header.

In other words, a terminal that has received the multi-carrier SCEH in the format as illustrated in Table 1 controls to early terminate the listening window of the relevant carrier, but a terminal that has received the multi-carrier SCEH which does not include the target carrier index controls to early terminate the listening window of all carriers.

Figure 7:
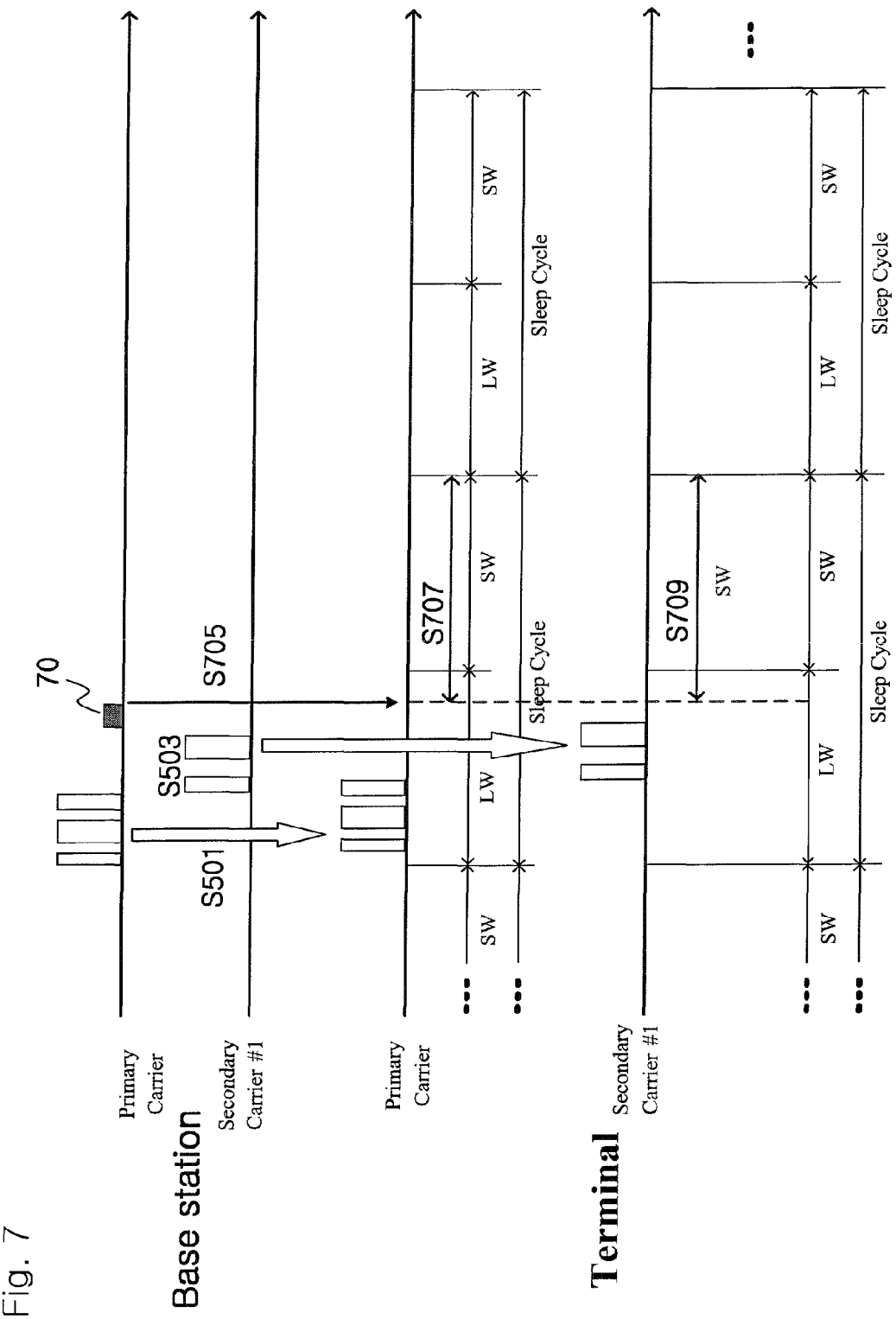
FIG. 7 is a view illustrating a process of terminating the listening windows of all carriers at a time through SCEH.

FIG. 7 is a view illustrating a process of terminating the listening windows of all carriers at a time through SCEH.

As illustrated in FIG. 7, the base station and the terminal perform traffic exchange through the primary carrier and the secondary carrier #1 (S501, S503).

At this time, in a circumstance that the terminal does not receive real-time services and non-real-time services, the base station does not transmit a TRF-IND message to the terminal.

Furthermore, a sleep mode parameter (sleep cycle, listening window interval) negotiated with the base station when the terminal enters into a sleep mode will be similarly applied to the primary carrier and the secondary carrier.

If a service received from the base station through the primary carrier and the secondary carrier #1 during the listening window is completed in the terminal, then the base station transmits a SCEH message to the terminal through the primary carrier (S705). The SCEH message has a format in which the target carrier index is not included.

The terminal that has received the SCEH message early terminates the listening window (LW) of all carriers and enters into a sleep window to reduce power consumption (S707, S709). However, if the length of SCEH is extendable and multiple active carriers should be included in the target carrier index, then an index of multiple active carriers corresponding to one SCEH may be included in the target carrier index. In this case, if it is a circumstance that the listening window of all active carrier(s) should be terminated, then the SCEH in which a target carrier index field is not included may be transmitted as illustrated in the foregoing case, or the SCEH configured such that an index of all active carriers is included in the target carrier index as illustrated in the following Table 2 may be transmitted.

TABLE 2

| Syntax | Size (bit) | Notes |
|---|---|---|
| Multi-Carrier Sleep Control EH format( ) { | — | — |
| LAST | 1 | 0 = Another extended header follows MCSCEH<br>1 = Another extended header does not follow MCSCEH |
| Type | TBD | MCSCEH Type |
| The number of target carrier index | variable | The number of carriers in which the listening window is early terminated |
| for (i=0; i<The number of target carrier index; i++) { | | |
|     Target carrier index | [TBD, 4] | Target carrier index for listening window termination |
| } | | |
| } // End of Multi-Carrier Sleep Control EH format( ) | — | — |

Another format of the SCEH is illustrated in the following Table 3, wherein a SCEH sub-type is newly defined to reuse the SCEH format in a single-carrier environment.

TABLE 3

| Syntax | Size (bit) | Notes |
|---|---|---|
| SCEH ( ) { | | |
| LAST | 1 | 0 = Another extended header follows SCEH<br>1 = Another extended header does not follow SCEH |

TABLE 3-continued

| Syntax | Size (bit) | Notes |
|---|---|---|
| Type | TBD | SCEH Type |
| SCEH sub-type | 1 | 0b00 = Listening Window control<br>0b01 = Resume Sleep Cycle Indication<br>0b10 = Multi-Carrier Listening Window control<br>0b11 = reserved |
| if (SCEH sub-type == Listening Window Control) { | | |
| Listening Window End or Extension | 1 | 0 = Listening Window End Indication<br>1 = Listening Window Extension Indication |
| Last frame of Extended Listening Window | 8 | The value is only valid with Listening Window End or Extension is set to 1; LSB of frame sequence. Indicate the frame that extended listening window is terminated; |
| }<br>...<br>else if (SCEH sub-type == Multi-Carrier Listening Window control) { | | |
| Listening Window End or Extension | 1 | 0 = Listening Window End Indication<br>1 = Listening Window Extension Indication |
| Last frame of Extended Listening Window | 8 | The value is only valid with Listening Window End or Extension is set to 1; LSB of frame sequence. Indicate the frame that extended listening window is terminated; |
| }<br>} | | |

In case where the "SCEH sub-type" parameter is set to "0b10" in the SCEH of Table 3, it indicates to control the listening window of a multi-carrier.

At this time, if the "listening window end or extension" parameter is set to "0", then it may be possible to terminate the listening window (LW) of all active carriers, or according to circumstances, terminate only the listening window of active secondary carriers excluding the primary carrier.

If the "listening window end or extension" parameter is set to "1", then the listening window may be extended as much as a value set in the "last frame of extended listening window" parameter. Even in this case, the listening window (LW) of all activated carriers may be extended, or according to circumstances, only the listening window of active (activated) secondary carriers excluding the primary carrier may be extended, or only the primary carrier may be extended but the listening window of the active secondary carriers not extended, or only secondary carrier(s) currently receiving data among the primary carrier and currently activated secondary carriers may be extended. Otherwise, only active carrier(s) currently receiving data may be extended.

Still another format of the SCEH is illustrated in the following Table 4, wherein a target carrier index field is added in the SCEH format of Table 3.

TABLE 4

| Syntax | Size (bit) | Notes |
|---|---|---|
| SCEH ( ) {<br>LAST | 1 | 0 = Another extended header follows SCEH<br>1 = Another extended header does not follow SCEH |
| Type | TBD | SCEH Type |
| SCEH sub-type | 1 | 0b00 = Listening Window control<br>0b01 = Resume Sleep Cycle Indication<br>0b10 = Multi-Carrier Listening Window control<br>0b11 = reserved |
| if (SCEH sub-type == Listening Window Control) { | | |
| Listening Window End or Extension | 1 | 0 = Listening Window End Indication<br>1 = Listening Window Extension Indication |
| Last frame of Extended Listening Window | 8 | The value is only valid with Listening Window End or Extension is set to 1; LSB of frame sequence. Indicate the frame that extended listening window is terminated; |
| }<br>...<br>else if (SCEH sub-type == Multi-Carrier Listening Window control) { | | |
| Target Carrier Index | 4 | |
| Listening Window End or Extension | 1 | 0 = Listening Window End Indication<br>1 = Listening Window Extension Indication |
| Last frame of Extended Listening Window | 8 | The value is only valid with Listening Window End or Extension is set to 1; LSB of frame sequence. Indicate the frame that extended listening window is terminated; |
| }<br>} | | |

If the "SCEH sub-type" parameter in the SCEH of FIG. 4 is set to "0b10", then indicates to control the listening window of a multi-carrier.

The "target carrier index" parameter represents an index of carriers subject to listening window end or extension. If the "listening window end or extension" parameter is set to "0" or "1", then the listening window (LW) of a carrier specified through the "target carrier index" parameter is terminated or extended.

Accordingly, if the number of carriers subject to listening window end or extension is a plural number, then SCEH messages as many as the number of the relevant carriers should be received to the terminal. Otherwise, as illustrated in the following Table 5, it may be possible to control the operation of the relevant carriers by including multiple target carrier indices in one SCEH corresponding to the format of the above Table 4.

TABLE 5

| Syntax | Size (bit) | Notes |
|---|---|---|
| SCEH ( ) { | | |
| LAST | 1 | 0 = Another extended header follows SCEH<br>1 = Another extended header does not follow SCEH |
| Type | TBD | SCEH Type |
| SCEH sub-type | 1 | 0b00 = Listening Window control<br>0b01 = Resume Sleep Cycle Indication<br>0b10 = Multi-Carrier Listening Window control<br>0b11 = reserved |
| if (SCEH sub-type == Listening Window Control) { | | |
| Listening Window End or Extension | 1 | 0 = Listening Window End Indication<br>1 = Listening Window Extension Indication |
| Last frame of Extended Listening Window | 8 | The value is only valid with Listening Window End or Extension is set to 1; LSB of frame sequence. Indicate the frame that extended listening window is terminated; |
| } | | |
| ... | | |
| else if (SCEH sub-type == Multi-Carrier Listening Window control) { | | |
| The number of target carrier index | variable | The number of carriers in which the LW is early terminated |
| for (i=0; i<The number of target carrier index; i++) { | | |
|     Target carrier index | [TBD, 4] | |
| Listening Window End or Extension | 1 | 0 = Listening Window End Indication<br>1 = Listening Window Extension Indication |
| Last frame of Extended Listening Window | 8 | The value is only valid with Listening Window End or Extension is set to 1; LSB of frame sequence. Indicate the frame that extended listening window is terminated; |
| } | | |
| } | | |

Yet still another format of the SCEH is illustrated in the following Table 6, wherein a target carrier index field is illustrated in the format of a bitmap.

TABLE 6

| Syntax | Size (bit) | Notes |
|---|---|---|
| SCEH ( ) { | | |
| LAST | 1 | 0 = Another extended header follows SCEH<br>1 = Another extended header does not follow SCEH |
| Type | TBD | SCEH Type |
| SCEH sub-type | 2 | 0b00 = Listening Window control<br>0b01 = Resume Sleep Cycle Indication<br>0b10 = Multi-Carrier Listening Window control<br>0b11 = reserved |
| if (SCEH sub-type == Listening Window Control) { | | |
| Listening Window End or Extension | 1 | 0 = Listening Window End Indication<br>1 = Listening Window Extension Indication |
| if (Listening Window End or Extension == 1) { | | |
| Last frame of Extended Listening Window | 8 | The value is only valid with Listening Window End or Extension is set to 1; LSB of frame sequence. Indicate the frame that extended listening window is terminated; |
| } | | |
| } | | |
| else if (SCEH sub-type == Resume Sleep Cycle Indication) { | | |
| Scheduled Sleep Cycle Interruption included | 1 | 0 = no scheduled Sleep Cycle interruption is included with the Resume Sleep Cycle Indication<br>1 = scheduled Sleep Cycle interruption is included with the Resume Sleep Cycle Indication |
| if (Scheduled Sleep Cycle Interruption included == 1) { | | |
| Start Frame Offset for Scheduled Sleep Cycle Interruption | 8 | Number of frames in the future from the frame containing this SCEH at which the scheduled Sleep Cycle interruption will occur. Frame offset is value of this field plus one (i.e. range is 1 to 256). |
| } | | |
| } | | |
| else if (SCEH sub-type == Multi-Carrier Listening Window control) { | | |
|     Target Carriers bitmap | TBD | A bitmap is configured as many as the number of active carriers in which the listening window is terminated. If each bit is set to "1", then the listening window of active carriers can be terminated based on a target carrier index below. |
| For(i=0; i< Num positive target carrier; i++) { | | As many as the number of being set to "1" in a target carriers bitmap, target carrier indices in which the listening window is to be terminated will be included. Num positive target carrier represents the number of bits being set to "1" in a target carriers bitmap. |
|     Target carrier index | [TBD, 4] | Carrier index of the target secondary carrier on which DL data transmission ends |
| } | | |
| } | | |
| } | | |

An early termination indication of the carrier listening window through the SCEH may be possible through a unicast MAC management message according to another embodiment of the present invention.

Figure 8:
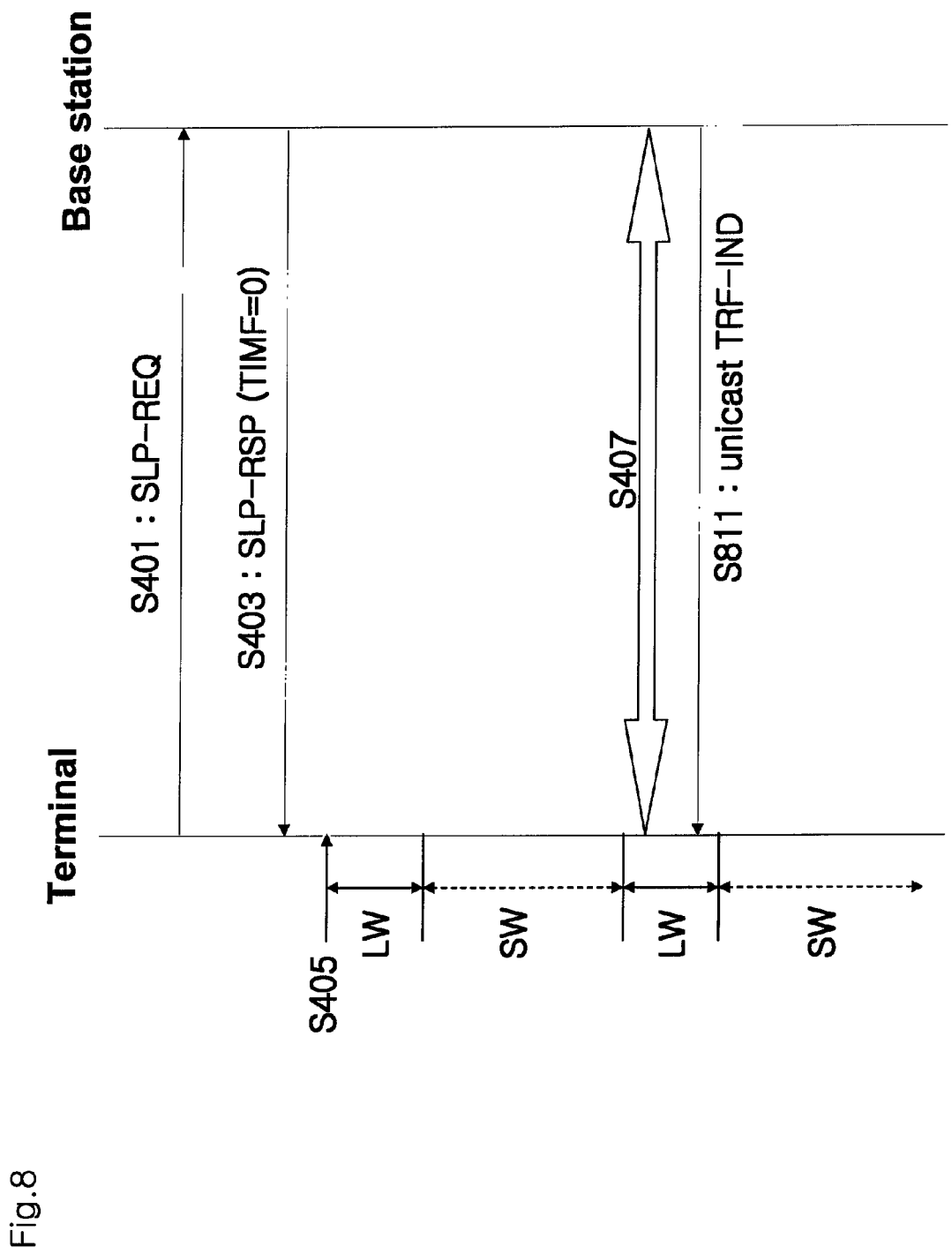
FIG. 8 is a view illustrating a sleep mode operation of a terminal in a multi-carrier environment according to another embodiment of the present invention in which a carrier early termination indication operation through a unicast TRF-IND message is shown.

FIG. 8 is a view illustrating a sleep mode operation of a terminal in a multi-carrier environment according to another embodiment of the present invention, wherein a carrier early termination indication operation through a unicast TRF-IND message is shown.

As described above with reference to FIG. 4, if there is no communication with the base station for a predetermined period of time subsequent to data communication with the base station, then the terminal transmits an SLP-REQ message to the base station to request the state change into a sleep mode (S401).

The base station transmits an SLP-RSP message in response to the SLP-REQ transmitted by the terminal (S403).

At this time, if only real-time services exist or real-time services and non-real-time services are mixed together for the traffic type being serviced to the terminal by the base station, then the base station transmits traffic indication inactive information indicating that an indication (TRF-IND) as to whether traffic is generated is not transmitted to the terminal, to the terminal.

The traffic indication inactive information in which a traffic indication message flag (TIMF) parameter is set to "0" is included in the SLP-RSP message and transmitted.

The terminal refers to a start frame number parameter, which is a sleep mode start frame timing included in the SLP-RSP message, to transition the state into a sleep mode (S405).

Subsequently, the terminal may receive a downlink message transmitted by the base station during the listening window of the sleep mode through a primary carrier and/or secondary carriers activated in the normal mode state, and may transmit an uplink message to the base station through the active carriers (S407).

If traffic transmission being serviced through all secondary carriers is completed or traffic transmission being serviced through one or more secondary carriers is completed, then the base station transmits a unicast TRF-IND message to the terminal, thereby indicating to early terminate the listening window of the secondary carrier to reduce the power consumption of the terminal (S811).

The format of a unicast TRF-IND message may be illustrated in the following Table 7.

TABLE 7

| Syntax | Size (bit) | Notes |
|---|---|---|
| Unicast TRF_IND _Message_format( ) { | | |
| Management Message Type = X+3 | 8 | |
| The number of target carrier index | variable | The number of carriers in which the LW is early terminated |
| for (i=0; i<The number of target carrier index; i++) { | | |
| Target carrier index | [TBD, 4] | Target carrier index for listening window termination |
| } | | |
| Padding | 4 | If needed, for alignment to byte boundary. |
| } // End of Unicast AAI_TRF-IND | | |

Referring to the unicast TRF-IND message in FIG. 7, the "number of target carrier index" parameter represents the number of carriers in which the listening window is early terminated, and the "target carrier index" represents an index of carriers subject to listening window early termination.

A listening window early termination indication of the carrier may be transferred as a unicast TRF-IND message with the format of a bitmap as illustrated in the following Table 8.

TABLE 8

| Syntax | Size (bit) | Notes |
|---|---|---|
| Unicast TRF_IND_Message_format( ) { | | |
| Management Message Type = X+3 | 8 | |
| LWT (Listening Window Termination) bitmap | variable | The number of carriers in which the LW is to be early terminated will be a size of the bitmap |
| Num_Positive_LWT | | The number of LWT bitmaps set to "1" |
| for (i=0; i<Num_Positive_LWT; i++) { | | |
| Target carrier index | [TBD, 4] | Target carrier index for listening window termination |
| } | | |
| Padding | 4 | If needed, for alignment to byte boundary. |
| } // End of Unicast AAI_TRF-IND | | |

Furthermore, according to circumstances, as illustrated in the following Table 9, it may be transmitted such that a "target carrier index" parameter is not included in the unicast TRF-IND message and a "LWT" flag indicating listening window early termination is set to "1", thereby indicating to terminate the listening window of all carriers at a time.

TABLE 9

| Syntax | Size (bit) | Notes |
|---|---|---|
| Unicast AAI_TRF_IND _Message_format( ) { | | |
| Management Message Type = X+3 | 8 | |
| LWT (Listening Window Termination) Flag | 1 | If this bit is set, listening window shall be early terminated. |
| } | | |

Hereinafter, a method of terminating a sleep window and reentering into a listening window when traffic is generated in the sleep window of a carrier in which the listening window is early terminated will be described.

Figure 9:
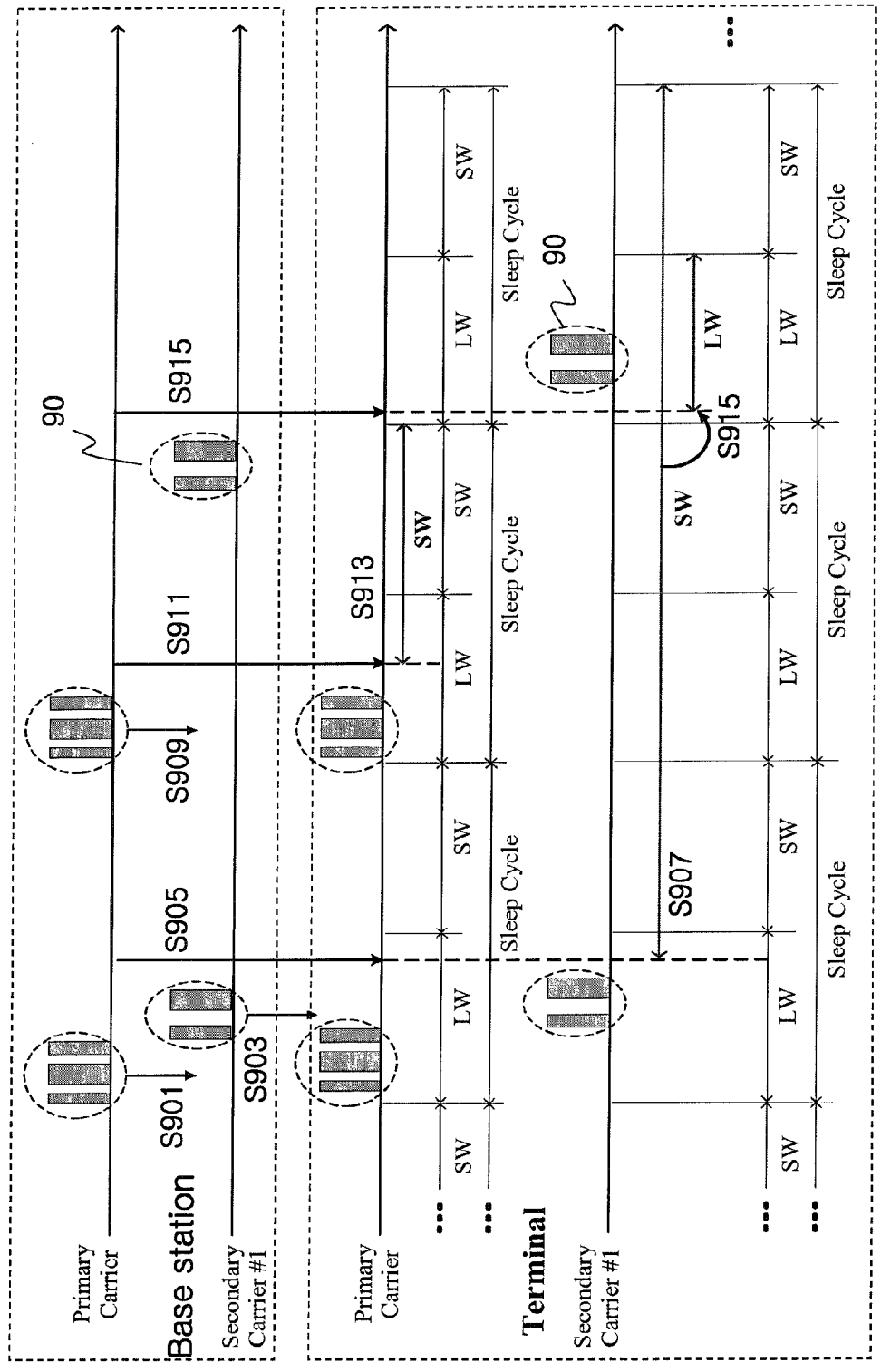
FIG. 9 is a view illustrating that the listening window of a carrier is early terminated, and then the listening window is active again.

FIG. 9 is a view illustrating that the listening window of a carrier is early terminated, and then the listening window is activated again.

The base station and the terminal perform traffic exchange through a primary carrier and a secondary carrier #1 (S901, S903).

At this time, in a circumstance that the terminal receives real-time services and non-real-time services together, the base station does not transmit a TRF-IND message indicating traffic generation to the terminal. Furthermore, a sleep mode parameter (sleep cycle, listening window interval, etc.) negotiated with the base station when the terminal initially enters into a sleep mode is similarly applied to the primary and secondary carrier.

If a service is completed through the secondary carrier #1 while the terminal receives the service through the primary carrier and the secondary carrier #1, then the base station transmits a unicast TRF-IND message to the terminal through the primary carrier, thereby indicating to early terminate the listening window of the secondary carrier #1 (S905).

The terminal that has received the unicast TRF-IND message (S905) early terminates the listening window (LW) and enters into a sleep window to reduce power consumption (S907).

Subsequently, if traffic exchange is completed while receiving a service through the primary carrier, then the base station transmits the unicast TRF-IND message (S911) to the terminal through the primary carrier, thereby indicating to early terminate the listening window of the primary carrier (S911).

The terminal that has received the unicast TRF-IND message early terminates the listening window (LW) and enters into a sleep window to reduce power consumption (S913).

Also, if traffic exchange has been previously completed through the secondary carrier #1 to terminate the listening window but a new service 90 is generated and thus it is necessary to reactivate the listening window (LW) of the secondary carrier #1, then the base station transmits a unicast TRF-IND message (S915) to the terminal through the primary carrier, thereby indicating to reactivating the listening window (LW) of the secondary carrier #1 (S915).

The listening window (LW) reactivation indication message of the secondary carrier #1 may be possible through SCEH in addition to the unicast TRF-IND.

The terminal that has received the unicast TRF-IND message or SCEH through the primary carrier reactivates the listening window (LW) of the secondary carrier #1 and receives new service traffic from the base station through the secondary carrier #1 (S917).

A unicast TRF-IND message indicating to early terminate or activate the listening window of a carrier is illustrated in the following Table 10.

TABLE 10

| Syntax | Size (bit) | Notes |
| --- | --- | --- |
| Unicast TRF_IND_Message_format( ) { | | |
| Management Message Type = X+3 | 8 | |
| LWTNA (Listening Window Termination & Activation) Flag | 1 | 0: Listening window is early terminated for target carrier<br>1: The listening window of all carriers in which the listening window has been early terminated is activated |
| if (LWTNA ==0){ | | |
| The number of target carrier index | variable | The number of carriers in which the listening window is activated |
| for (i=0; i<The number of target carrier index; i++) { | | |
| Target carrier index | [TBD, 4] | Target carrier index for listening window termination |
| } | | |
| } // end of if (LWTNA ==0) | | |
| if (LWTNA ==1) { | | |
| The number of target carrier index | variable | The number of carriers in which the LW is activated |
| for (i=0; i<The number of target carrier index; i++) { | | |
| Target carrier index | [TBD, 4] | Target carrier index for listening window activation |
| } | | |
| } // end of if (LWTNA == 1) | | |
| Padding | 4 | If needed, for alignment to byte boundary. |
| } // End of Unicast AAI_TRF-IND | | |

In the unicast TRF-IND message in Table 10, the "LWTNA" parameter is a value indicating the listening window early termination or listening window reactivation of a carrier, and the "number of target carrier index" parameter is a value indicating the number of carriers in which the listening window is early terminated or reactivated, and the "target carrier index" represents a value indicating an index of carriers subject to listening window early termination or reactivation.

A listening window early termination or reactivation indication of the carrier may be transferred as a unicast TRF-IND message with the format of a bitmap as illustrated in the following Table 11.

TABLE 11

| Syntax | Size (bit) | Notes |
| --- | --- | --- |
| Unicast TRF_IND_Message_format( ) { | | |
| Management Message Type = X+3 | 8 | |
| LWT(Listening Window Termination) bitmap | variable | The number of carriers in which the LW is to be early terminated is a size of bitmap. |
| Num_Positive_LWT | | The number of LWT bitmaps set to "1" |

TABLE 11-continued

| Syntax | Size (bit) | Notes |
|---|---|---|
| for (i=0; i<Num_Positive_LWT; i++) { | | |
|    Target carrier index | [TBD, 4] | Target carrier index for listening window termination |
| } | | |
| LWA(Listening Window Activation) bitmap | variable | The number of carriers in which the LW is to be early activated is a size of bitmap. |
| Num_Positive_LWA | | The number of LWA bitmaps set to "1" |
| for (i=0; i<Num_Positive_LWA; i++) { | | |
|    Target carrier index | [TBD, 4] | Target carrier index for listening window termination |
| } | | |
| Padding | 4 | If needed, for alignment to byte boundary. |
| } // End of Unicast AAI_TRF-IND | | |

In addition, a carrier listening window early termination or reactivation indication message in FIG. 9 may be indicated through a multi-carrier SCEH message in Table 12.

TABLE 12

| Syntax | Size (bit) | Notes |
|---|---|---|
| Multi-Carrier Sleep Control EH format( ) { | | |
| LAST | 1 | 0 = Another extended header follows MCSCEH<br>1 = Another extended header does not follow MCSCEH |
| Type | TBD | MCSCEH Type |
| LWTNA (Listening Window Termination & Activation) Flag | 1 | 0: Listening window is early terminated for target carrier<br>1: Listening window in which the listening window has been early terminated is activated |
| if (LWTNA == 0 ) { | | |
|    Target carrier index | [TBD, 4] | Target carrier index for listening window termination |
| } | | |
| if (LWTNA == 1 ) { | | |
|    Target carrier index | [TBD, 4] | Target carrier index for listening window activation |
| } | | |
| } // End of Multi-Carrier Sleep Control EH format( ) | | |

The "LWTNA" parameter in the SCEH message of Table 12 is a value indicating the listening window early termination or listening window reactivation, and the "target carrier index" parameter corresponds to the relevant carrier index information. If the listening window of multiple carriers is terminated or reactivated, then SCEH messages may be transmitted as many as the number of the relevant carriers.

Another embodiment of SCEH is illustrated in the following Table 13, wherein the "target carrier index" parameter is not included in a multi-carrier SCEH message, but the "LWT & LWA flag" is included only to configure the relevant flag, thereby early terminating or reactivating the listening window of all carriers at a time.

TABLE 13

| Syntax | Size (bit) | Notes |
|---|---|---|
| Multi-Carrier Sleep Control EH format( ) { | | |
| LAST | 1 | 0 = Another extended header follows MCSCEH<br>1 = Another extended header does not follow MCSCEH |
| Type | TBD | MCSCEH Type |
| LWTNA (Listening Window Termination & Activation) Flag | 1 | 0: Listening window is early terminated for all activated carrier<br>1: Listening window in which the listening window has been early terminated is activated |
| } // End of Multi-Carrier Sleep Control EH format( ) | | |

Figure 10:
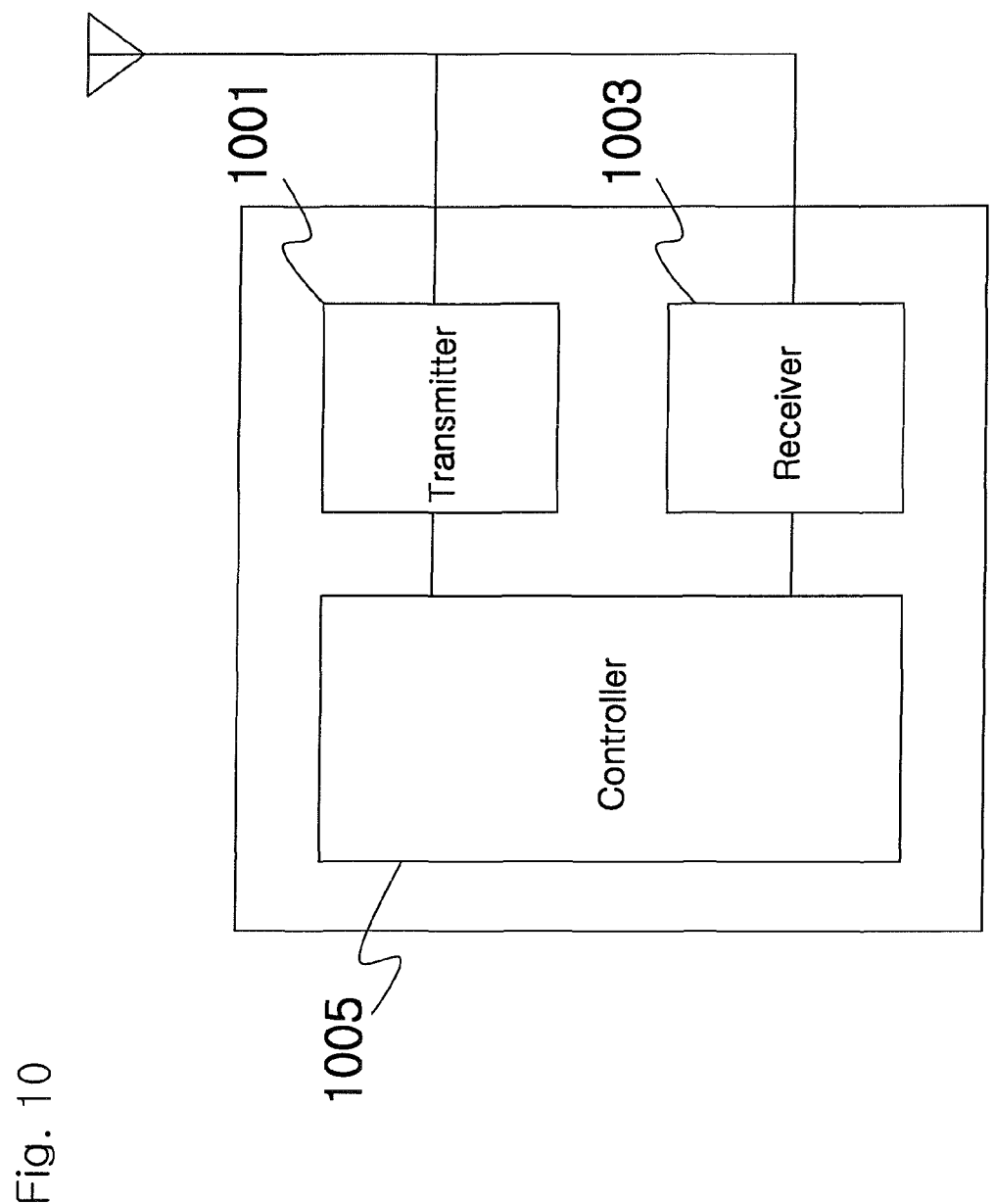
FIG. 10 is a block diagram schematically illustrating the construction of an apparatus according to an embodiment of the present invention.

FIG. 10 is a block diagram schematically illustrating the construction of an apparatus according to an embodiment of the present invention.

The apparatus may be a base station or terminal, and in case of the base station, the apparatus may include a receiver 1003 for receiving a state change request into a sleep mode, a transmitter 1001 for transmitting a sleep mode operation parameter and data, and a controller 1005.

The receiver 1003 may receive uplink data and a state change request message into a sleep mode, and the like, from the terminal.

The transmitter 1001 may transmit a sleep cycle ID (SCID), a listening window, and traffic indication inactive information indicating that an indication (TRF-IND) as to whether traffic is generated is not transferred to the terminal through the activated primary carrier to the terminal, and send downlink data to the terminal through the activated primary or secondary carrier during the listening window of the terminal.

If the data sending to the terminal is completed, then the controller 1005 may generate a listening window early termination indication message indicating to early terminate the listening window of the active primary or secondary carrier of the terminal that has received the downlink data.

Furthermore, the listening window early termination indication message generated by the controller 1005 is a SCEH message or unicast TRF-IND message as described above, and may be sent to the terminal through the active primary carrier or secondary carrier.

In case where the apparatus is a terminal, the apparatus may include a transmitter 1001 for transmitting a state change request into a sleep mode to the base station, a receiver 1003 for receiving a sleep mode operation parameter and data from the base station, and a controller 1005 for controlling a sleep mode operation.

The receiver 1003 may receive a sleep mode parameter including a sleep cycle ID (SCID), a listening window, and an indication (TRF-IND) as to whether traffic is generated through the primary carrier from the base station.

The controller 1005 may control a sleep mode operation with reference to the sleep mode parameter received through the receiver 1003.

At this time, if data reception through the activated primary or secondary carrier from the base station is completed during the listening window of the terminal, then the controller 1005 may control to receive a listening window early termination indication indicating to early terminate the listening window of the activated primary or secondary carrier of the terminal that has received the downlink data through the receiver 1003, and early terminate the listening window of the activated primary or secondary carrier.

The listening window early termination indication message is a SCEH message or unicast TRF-IND message as described above, and may be received through the primary carrier or secondary carrier.

The method according to the present invention as described above may be implemented by software, hardware, or a combination of both. For example, the method according to the present invention may be stored in a storage medium (for example, an internal memory of the terminal, flash memory, hard disk, and so on), and may be implemented by codes or instructions within a software program that can be performed by a processor (for example, a microprocessor within the terminal).

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

What is claimed is:

1. A method for a mobile station operating in a wireless communication system, the method comprising:
   receiving configuration information for power management from a base station, wherein the configuration information informs the mobile station of a first time period during which the mobile station monitors signals from the base station and of a second time period during which the mobile station does not monitor signals from the base station;
   applying the configuration information for power management to one or more primary carriers and one or more activated secondary carriers;
   receiving downlink data from the base station via the one or more primary carriers and the one or more activated secondary carriers during the first time period; and
   receiving a specific Medium Access Control (MAC) message from the base station, wherein the mobile station stops the first time period when receiving the specific MAC message.

2. The method of claim 1, wherein, when the mobile station receives the specific MAC message, the mobile station stops the first time period even though a time length based on the received configuration information is not elapsed yet.

3. The method of claim 1, wherein, when the mobile station receives the specific MAC message, the mobile station stops the first time period for the one or more activated secondary carriers.

4. The method of claim 1, wherein, when the mobile station receives the specific indication, the mobile station does not deactivate the one or more activated secondary carriers.

5. A mobile station apparatus operating in a wireless communication system, the mobile station apparatus comprising:
   a receiver configured to receive configuration information for power management from a base station, wherein the configuration information informs the mobile station apparatus of a first time period during which the mobile station apparatus monitors signals from the base station and of a second time period during which the mobile station apparatus does not monitor signals from the base station; and
   a controller connected to the receiver and configured to communicate with the base station via one or more primary carriers and one or more activated secondary carriers, and to apply the configuration information for power management to the one or more primary carriers and the one or more activated secondary carriers,
   wherein the controller controls the receiver to receive downlink data from the base station via the one or more primary carriers and the one or more activated secondary carriers during the first time period; and
   wherein the controller stops the first time period, when a specific Medium Access Control (MAC) message is received by the receiver from the base station.

6. The mobile station apparatus of claim 5, wherein, when the specific MAC message is received, the controller stops the first time period even though a time length based on the configuration information is not elapsed yet.

7. The mobile station apparatus of claim 5, wherein, when the specific MAC message is received, the controller stops the first time period for the one or more activated secondary carriers.

8. The mobile station apparatus of claim 5, wherein, when the specific MAC message is received, the controller does not deactivate the one or more activated secondary carriers.

* * * * *